H. C. JARR.
BEATER.
APPLICATION FILED OCT. 7, 1908.
910,200.
Patented Jan. 19, 1909.
2 SHEETS—SHEET 1.
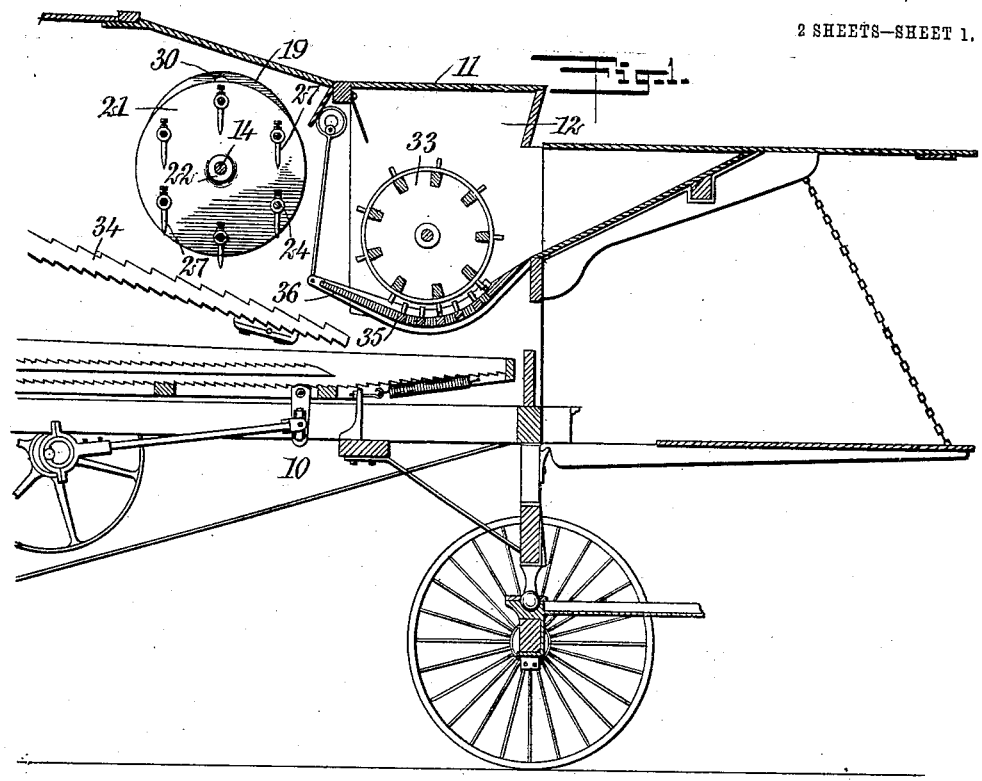
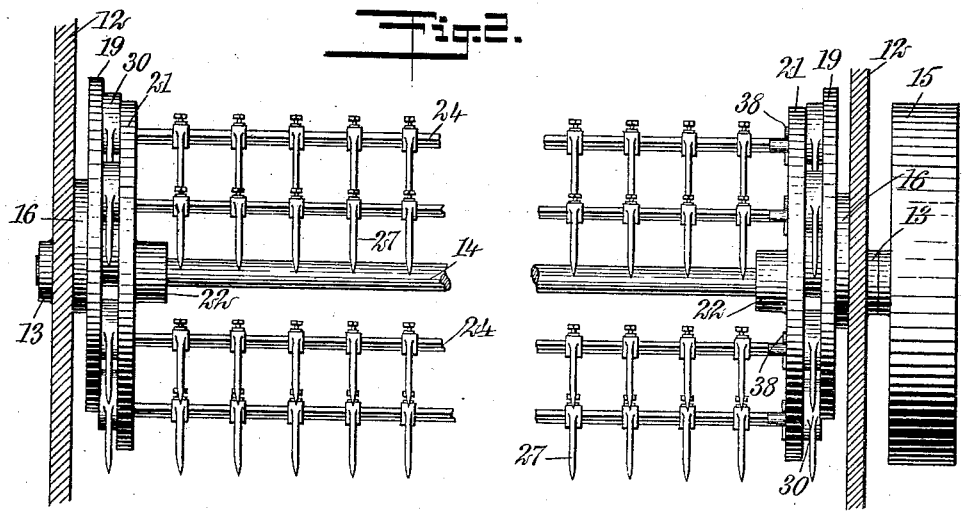
WITNESSES
INVENTOR
Herman C. Jarr
BY
ATTORNEYS

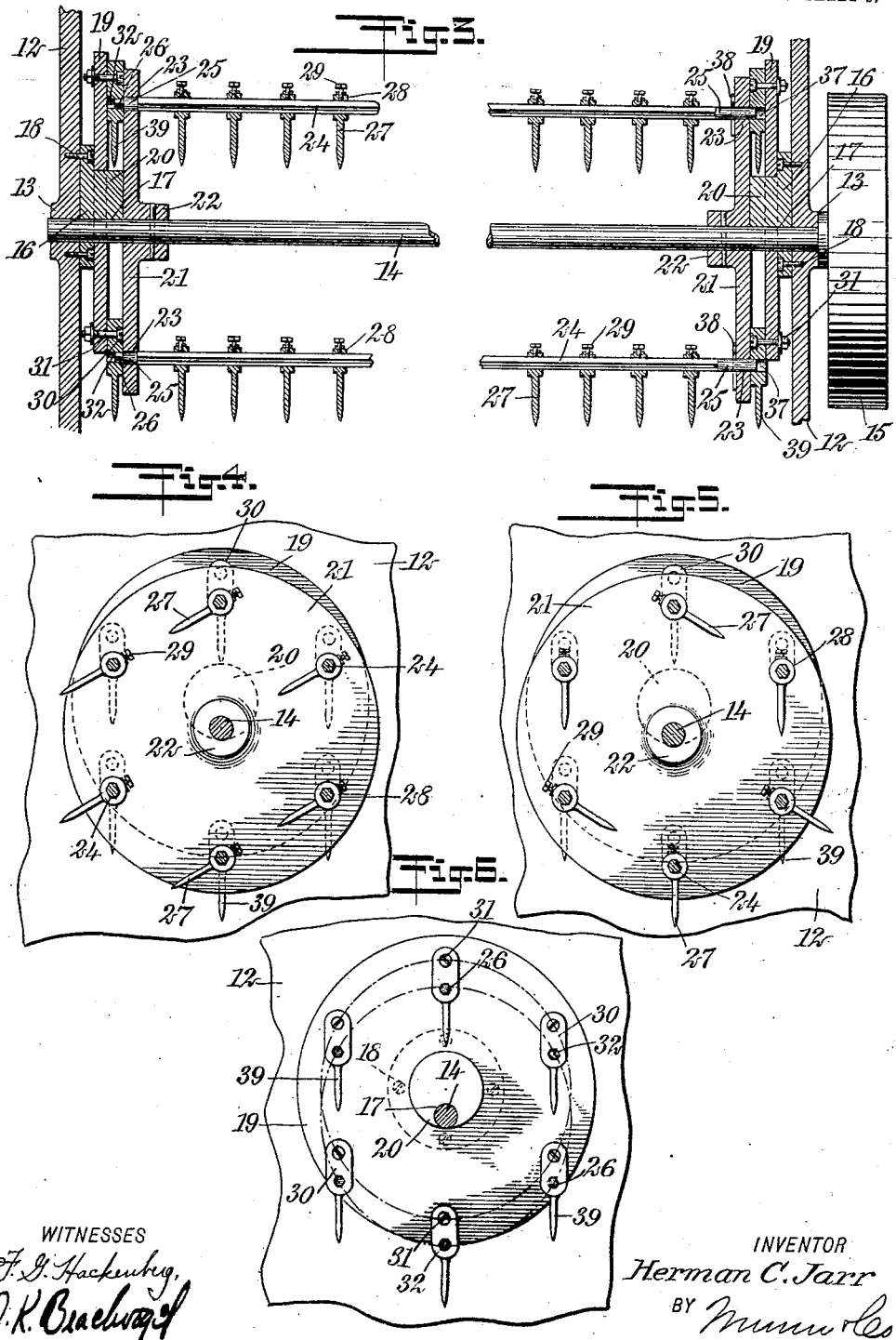

UNITED STATES PATENT OFFICE.

HERMAN CHRISTIAN JARR, OF PLUMMER, MINNESOTA.

BEATER.

No. 910,200.        Specification of Letters Patent.        Patented Jan. 19, 1909.

Application filed October 7, 1908. Serial No. 456,530.

*To all whom it may concern:*

Be it known that I, HERMAN CHRISTIAN JARR, a citizen of the United States, and a resident of Plummer, in the county of Red Lake and State of Minnesota, have invented a new and Improved Beater, of which the following is a full, clear, and exact description.

This invention relates to beaters for threshing machines and the like, and more particularly to a beater comprising parts rotatable about different axes so that one is eccentric with respect to the other, and a plurality of adjustable teeth carried by one of the parts and controlled by the other so that the teeth have a constant angularity when the parts rotate, that is, the teeth are always at the same angle.

An object of the invention is to provide a simple, durable and efficient beater for threshing machines and the like, which can be placed adjacent to and behind the cylinder of the machine, where it serves effectually to advance the straw from the cylinder and to prevent the latter from being wound with straw, and in which the teeth can be set at any desired angle so that they enter and leave the straw at the same angle, and without a rotary motion except around the axis of the rotatable member which carries them, and consequently, it is impossible for the beater itself to become wound with straw.

A further object of the invention is to provide a beater which has a wide range of adjustment, in which the teeth in passing through the straw with a raking motion thoroughly separate the straw and deliver it loosely and evenly to the straw rack or shaker of the thresher, and by means of which a large percentage of the grain passing beyond the cylinder unthreshed will be threshed out by the beater teeth.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of a part of a threshing machine showing an embodiment of my invention applied thereto; Fig. 2 is an enlarged transverse section of the threshing machine showing the beater in elevation, with parts broken away; Fig. 3 is an enlarged longitudinal section of the body showing parts broken away; Fig. 4 is a transverse section of the beater showing the teeth in a certain adjustment; Fig. 5 is a similar view showing the teeth in a further adjustment; and Fig. 6 is a similar view showing a detail in a still further adjustment.

Before proceeding to a more detailed explanation of my invention, it should be clearly understood that while the same is particularly applicable to beaters of threshers and similar agricultural or other machines, it can also be advantageously applied as a mechanical movement or element for mechanism of different types in which it is desired to provide relatively rotatable and eccentric parts, one of which carries teeth or the like which are controlled by the other, so that as the parts rotate the teeth maintain a constant angularity with respect to each other and with respect to the horizontal or vertical. I prefer to fashion the beater entirely from suitable metal such as cast iron and steel, although any other suitable material adapted for the purpose may be employed.

The details of construction can be varied in accordance with individual preference or special conditions, without departing from the underlying spirit of my invention which does not reside in these details but consists broadly, as stated above, in the provision of the relatively rotatable and eccentric parts, with the adjustable teeth carried by one of the parts and controlled by the other so that the teeth maintain a constant angularity.

Referring more particularly to the drawings, 10 represents the body of a threshing machine having a casing 11 of any preferred or common form. The side walls 12 of the casing are provided with bearings 13 in which is journaled a transverse shaft 14 projecting at one end beyond the casing and having a pulley 15 adapted to carry a driving belt so that the shaft can be suitably actuated from the mechanism of the thresher. Collars 16 having eccentric openings 17 therethrough, are arranged by means of the openings 17, upon the shaft adjacent to the walls 12 and are rigidly secured to the latter in any suitable manner, for example, by means of countersunk screws 18.

Disks 19 having substantially central openings are loosely positioned upon the collars 16 which have bearing extensions 20 for the purpose. Adjacent to the collars at the inner sides thereof, are beater heads 21 having hubs 22 provided with openings therethrough to receive the shaft 14 and rigidly keyed or pinned upon the shaft so that they are constrained to rotate therewith. Near the peripheries, the heads have openings 23 therethrough to receive the ends of tooth-supporting bars 24. The latter are preferably of angular cross section and near the ends have portions 25 of circular section adapted movably to fit into the openings 23. Each bar has an extremity 26 which projects outwardly beyond a head and is also of angular section for a purpose which will appear hereinafter. Each of the bars carries a series of teeth 27 which may be of any suitable form and which preferably have heads 28 provided with openings therethrough to receive the bars, and adapted to be secured adjustably in place upon the latter by means of set screws 29.

Links 30 are pivotally mounted upon the disks 19 at the sides of the same adjacent to the heads 21, by means of pivot bolts 31. The links on one of the disks 19 have openings 32 therein which are of angular cross section to receive the ends 26 of the bars so that the latter cannot turn with respect to the links. The links carried by the other disks 19 have circular openings 37 formed to receive the circular ends of the bars, opposite to the ends 26. The bars are provided with cotter pins 38 adjacent to the head remote from the ends 26, to limit the insertion of the bars into the openings 37. The bars, which are rotatable with respect to the heads 21, are controlled by the disks 19, the latter being eccentric with respect to the heads. Consequently, as the shaft 14 is turned, the bars, because of the heads 21 which are rigid with the shaft, rotate about the shaft, and at the same time the bars themselves are independently rotated by means of the links, owing to the pivotal connection between the links and the disks 19, and because the latter are eccentric with respect to the heads and rotate about an axis other than the shaft 14. This arrangement effects the constant angularity of the teeth while the parts are rotated about their respective axes. Consequently the teeth will enter the straw, pass through the same and leave the straw at the same angle, with a raking motion and with no rotary motion whatever except that about the shaft 14 and the oscillatory motions imparted by the links to the tooth bars 24. As a result there is no tendency of the straw to wind about the beater and clog the same or otherwise interfere with its operation. The beater is preferably positioned adjacent to and at the rear of the cylinder 33 of the threshing machine and above the straw rack 34. The cylinder has under the same the concave 35, which terminates in the grate 36. The beater removes the straw from the latter.

The links 30 are extended to form the end teeth 39 of the beater. The teeth 27 can be adjusted by the adjusting bars 24. This is accomplished by withdrawing the pins 38 and sliding the bars longitudinally into the openings 37 to withdraw the ends 26 from the openings 32 so that the bars can be turned into the desired position and then have the ends 26 reinserted in the openings 32. It will be understood that the end teeth 39 upon the links are not adjustable but maintain constant, normal, substantially vertical positions.

Having thus described my invention, I claim as new and desire to secure by Letters Patent:

1. A beater comprising a shaft, a member constrained to rotate with said shaft, a second member eccentrically mounted upon said shaft and free to rotate independently thereof, series of adjustable teeth carried by said first member, and links connecting said teeth and said second member, whereby said second member controls said teeth so that the latter have a constant angularity while said parts rotate, said links having extensions constituting further teeth.

2. A beater comprising a shaft, heads rigid with said shaft, a fixed eccentric, a disk loose upon said eccentric, bars pivotally and adjustably carried between said heads, teeth mounted upon said bars, and links pivoted upon said disk and rigidly secured to said bars, said links being extended to form further teeth.

3. A beater comprising a shaft, heads rigid with said shaft, eccentrics stationary with respect to said shaft and having openings movably receiving the same, disks loosely mounted upon said eccentrics adjacent to said heads, bars pivotally and adjustably mounted between said heads, teeth carried by said bars, links pivoted upon said disks and operatively engaging said bars, said links terminating in teeth.

4. A beater, comprising a shaft, eccentrics stationary with respect to said shaft and having openings movably receiving the same, disks mounted to rotate upon said eccentric, heads rigid with said shaft and adjacent to said disks, said heads having bearing openings therethrough, bars journaled in said bearing openings and having ends projecting therebeyond, said bars intermediate said heads having teeth adjustably mounted thereon, each of said bars at one end being of angular section beyond said corresponding head, links pivoted upon one of said disks and having openings of angular section adapted to receive said projecting ends of angular section of said bars, links pivoted upon the other of said disks and having openings adapted slidably to receive said other projecting ends of said bars, and removable pins for holding said bars against longitudinal movement in one direction.

5. A beater, comprising a shaft, an eccentric stationary with respect to said shaft and having an opening movably receiving the same, a disk mounted to rotate upon said eccentric, a head rigid with said shaft and adjacent to said disk, said head having bearing openings therethrough, bars journaled in said bearing openings and having ends projecting therebeyond, said bars at one side of said head having teeth adjustably mounted thereon, each of said bars at one end being of angular section beyond said head, links pivoted upon said disk and having openings of angular section adapted to receive said projecting ends of angular section of said bars, said bars being slidable in the directions of their length whereby said ends of angular section can be disengaged from said links to permit said bars to be adjusted to vary the angularity of said teeth.

6. A beater comprising a shaft, eccentrics stationary with respect to said shaft and having openings movably receiving the same, disks mounted to rotate upon said eccentrics, heads rigid with said shaft and adjacent to said disks, said heads having bearing openings therethrough, bars journaled in said bearing openings and having ends projecting therebeyond, said bars intermediate said heads, being of angular section and having teeth adjustably mounted thereon, each of said bars at one end being of angular section beyond said corresponding head, links pivoted upon one of said disks and having openings of angular section adapted to receive said projecting ends of angular section of said bars, links pivoted upon the other of said disks and having openings adapted slidably to receive said other projecting ends of said bars, and removable means for holding said bars against longitudinal movement in one direction, said links being extended to form teeth.

In testimony whereof I have signed my name to this specification in the presence of two subscribing witnesses.

HERMAN CHRISTIAN JARR.

Witnesses:
M. E. LATTA,
CHAS. W. LATTA.